US000001993B1

(19) United States

(12) Statutory Invention Registration (10) Reg. No.: US H1993 H

Chao (43) Published: Sep. 4, 2001

(54) FLOATING-POINT DIVISION AND SQUAREROOT CIRCUIT WITH EARLY DETERMINATION OF RESULTANT EXPONENT

(75) Inventor: Chin-Chieh Chao, I-Lan (TW)

(73) Assignee: Sun Microsystems, Inc., Palo Alto, CA (US)

(21) Appl. No.: 08/881,700

(22) Filed: Jun. 25, 1997

(51) Int. Cl.[7] ..... G06F 7/52

(52) U.S. Cl. ..... 708/650

(58) Field of Search ..... 364/715.04, 736.5, 364/748.01, 748.04, 748.06, 748.08, 748.09, 748.1, 761, 764, 765, 766, 767, 752

(56) References Cited

U.S. PATENT DOCUMENTS

| | | | | |
|---|---|---|---|---|
| 4,975,868 | * | 12/1990 | Freerksen | 364/748.1 |
| 5,309,383 | * | 5/1994 | Kuroiwa | 364/748.1 |
| 5,481,745 | * | 1/1996 | Tatsumi | 708/504 |
| 5,619,439 | * | 4/1997 | Yu et al. | 364/748.1 |

OTHER PUBLICATIONS

Brent, Richard P. and Kung, H. T., "A Regular Layout for Parallel Adders" *IEEE Transactions On Computers* vol. C–31:260–264 (1982).

Santoro, Mark R. et al., "Rounding Algorithms for IEEE Multipliers" 176–183 *Proceedings of the 9th Symposium on Computer Arithmetic* (1989).

Yu, Robert K. and Zyner, Gregory B., "167 MHz Radix–4 Floating Point Multiplier" *Proceedings of the 12th Symposium on Computer Arithmetic* (1995).

"IEEE Standard for Binary Floating–Point Arithmetic", *ANSI/IEEE Std* 754–1985, New York, The Institute of Electrical and Electronic Engineers, Inc., (1985) p. 7–13 and 27.

UlraSPARC™ Programmer Reference Manual, Rev. 1.0, Sun Microsystems, Inc., p. 237 (1995).

* cited by examiner

*Primary Examiner*—Daniel T. Pihulic

(74) *Attorney, Agent, or Firm*—Forrest E. Gunnison

(57) ABSTRACT

A circuit calculates the exact biased resultant exponent before calculating the resultant mantissa of a division operation. The circuit includes a carry-save adder, a conditional-sum adder, a multiplexer and a comparator. The conventional carry-save adder receives the biased exponent of the dividend (e1), the one's complement of the biased exponent of the divisor (~e2), and the bias. The conditional-sum adder receives the sum and carry resultants of the carry-save adder, outputting {er0=e1+(~e2)+bias} and {er1=e1+(~e2)+bias+1}. The comparator controls the multiplexer to respectively select as the resultant exponent either er0 or er1 when the fraction of the dividend is less than or greater than or equal to the fraction of the divisor. A circuit for determining the resultant exponent of a squareroot operation includes a conditional-sum adder, a multiplexer and a selection logic circuit. The conditional-sum adder receives ½ of e2 and an adjusted bias. The adjusted bias is ½ of the bias (incremented if e2 is odd), causing the conditional-sum adder to output {er0=½e2+adjusted bias} and {er1=½e2+adjusted bias+1}. The selection logic controls the multiplexer to select er0, except in the case in which all three of the following conditions exist: (i) the fraction of the operand has no zeros; (ii) the squareroot operand is even; and (iii) the rounding mode is rounding to positive infinity.

17 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLOATING-POINT DIVISION AND SQUAREROOT CIRCUIT WITH EARLY DETERMINATION OF RESULTANT EXPONENT

FIELD OF THE INVENTION

The present invention relates to processors and, more particularly, to circuitry for performing floating-point division and squareroot operations.

BACKGROUND

Many currently available processors are configured to perform floating-point arithmetic such as, for example, division and squareroot, in compliance with the IEEE Standard for Binary Floating-Point Arithmetic (ANSI/IEEE Std 754-1985). which is incorporated herein by reference. In these processors, the exponent of the result of the operation is generally calculated after the mantissa computation is completed. Thus, the calculation of the resulting exponent is in the critical path of the division and squareroot operations.

Moreover, the mantissa computation can require twenty or more processor clock cycles to complete when using double precision. Thus, calculation of the resultant exponent has a relatively long latency. As is well known, the resultant exponent can then be checked for overflow and underflow exceptions, which are defined in the aforementioned IEEE standard.

The relatively long latency of the resulting exponent calculation can become problematic in the so-called superscalar type of processor. In particular, because superscalar processors may concurrently execute two or more instructions, an instruction may complete after a later-occurring instruction, which can result in an error. For example, an error may occur if the later-occurring instruction overwrites a register before a prior floating-point division instruction completes and an overflow or underflow exception occurs for a prior floating-point division operation. The error occurs because when an exception occurs during an instruction (i.e., the trapping instruction), the processor is required to abort all subsequent instructions and request a trap. After the trap-handler completes execution of the trapping instruction, the processor is restarted at the instruction immediately after the trapping instruction. Of course, the completion of a subsequent instruction that overwrites a register before the exception is handled by the trap-handler can cause an error in the program execution.

Because the resultant exponent is not calculated until late in the instruction execution, a conventional solution to this problem is to make a prediction (before the next subsequent instruction completes) of whether an overflow or underflow exception will occur. In this conventional scheme, a pessimistic prediction is performed to ensure that no overflow or underflow exceptions will be missed by the trap-handler. Of course, pessimistic prediction will result in unnecessary traps, which decreases the performance of the processor. Thus, there is a need for a processor capable of early and exact calculation of the resultant exponent, which both increases performance and allows exact prediction of overflow and underflow.

SUMMARY

In accordance with the present invention, a floating-point division circuit is provided that calculates the exact biased resultant exponent before calculating the resultant mantissa. In one embodiment, the circuit includes a carry-save adder, a conditional-sum adder, a multiplexer and a comparator. The conventional carry-save adder is coupled to receive the biased exponent of the dividend (e1), the one's complement of the biased exponent of the divisor (~e2), and the bias (as defined in the aforementioned the ANSI/IEEE Standard for the precision format being used). The ANSI/IEEE Standard specifies that the mantissas of the dividend and operand can be in normalized form.

The conditional-sum adder is coupled to receive the sum and carry resultants of the carry-save adder and operates to output the sums {er0=e1+(~e2)+bias} and {er1=e1+(~e2)+bias+1}. The sum er0 is the resultant biased exponent of the division operation when the resultant mantissa is in a normalized form after calculation. Similarly, the sum er1 is the resultant biased exponent of the division operation when the resultant mantissa is not in a normalized form. The comparator provides an output signal that controls the multiplexer to select the sum er1 when the fraction of the dividend is greater than or equal to the fraction of the normalized divisor. Conversely, when the fraction of the normalized dividend is less than the fraction of the normalized divisor, the comparator causes the multiplexer to select the sum er0. Because the operation of the carry-save adder, conditional-sum adder and the comparator is relatively fast, the exact resultant exponent is available for underflow and overflow detection before the next instruction completes, thereby eliminating the need for pessimistic prediction.

In another embodiment of the invention adapted for determining the resultant exponent of a floating-point squareroot operation, the circuit includes a conditional-sum adder, a multiplexer and a selection logic circuit. The conditional-sum adder is coupled to receive the biased exponent (e2) of the squareroot operand, divided by two (i.e., right-shifted by one bit) and an adjusted bias. The adjusted bias is the exponent bias divided by two, which is incremented if the exponent e2 is odd (i.e., having a least significant bit equal to one). Thus, the conditional-sum adder outputs the sum {er0=½e2+adjusted bias} and the sum {er1=½e2+adjusted bias+1}. The resultant mantissa will end up in normalized form after calculation, except in the case in which all three of the following conditions exist: (i) the fraction of the operand has no zeros; (ii) the e2 is even; and (iii) the rounding mode is rounding to positive infinity (as defined in the aforementioned IEEE standard). The selection logic monitors these three conditions and causes the multiplexer to select er0 to output as the biased resultant exponent in all cases except when all three of the above-conditions occur. When all three of these conditions occur, the selection logic causes the multiplexer to select er1 to output as the biased resultant exponent. This embodiment determines the exact biased resultant exponent before the mantissa calculation is completed. Thus, unlike conventional squareroot circuits, the resultant exponent calculation is taken out of the critical path, thereby improving performance.

In yet another embodiment, the circuit is adapted to calculate the biased resultant exponent of floating-point division, squareroot and multiplication operations. This embodiment includes a bias selection circuit, a first multiplexer, a second multiplexer, a carry-save adder, a conditional-sum adder, a selection logic circuit and an output multiplexer. The first multiplexer selects either e1 for multiplication and division operations or zero for squareroot operations. The second multiplexer selects e2 for multiplication operations, (~e2) for division operations or ½e2 for squareroot operations. The bias selection circuit selects the appropriate bias for the precision format (e.g., single or double precision) for division operations or the adjusted bias (for single or double precision) for squareroot operations. The carry-save adder receives the selected output signals of the first and second multiplexers and the bias selection circuit. The conditional-sum adder receives the carry and sum output signals of the carry-save adder and outputs the sums er0 and er1. The selection logic circuit then causes the output multiplexer to select either er0 or er1 as described above for the floating-point division and squareroot embodiments. For floating-point multiplication operations, the selection logic circuit detects whether the mantissa multiplication resultant is normalized or not normalized. If the mantissa is normalized, the selection logic circuit causes the output multiplexer to select er0 and, conversely, if the mantissa is not normalized, the selection logic circuit causes the output multiplexer to select er1.

In a further refinement of this embodiment, two conventional overflow and two underflow detectors may be coupled to respectively receive the er0 and er1 signals from the conditional-sum adder so that the overflow and underflow of er0 and er1 may be determined concurrently with calculation of the multiplication mantissa resultant. The selection logic circuit is also implemented to select the output signals of the appropriate overflow and underflow detectors. This embodiment allows the use of same resultant exponent circuitry (which takes the resultant exponent calculation out of the critical path) for floating-point multiplication, division and squareroot operations. In addition, for the case of multiplication and division operations, the biased resultant exponent is calculated significantly faster, thereby eliminating the need for pessimistic prediction of the overflow or underflow of the resultant exponent.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
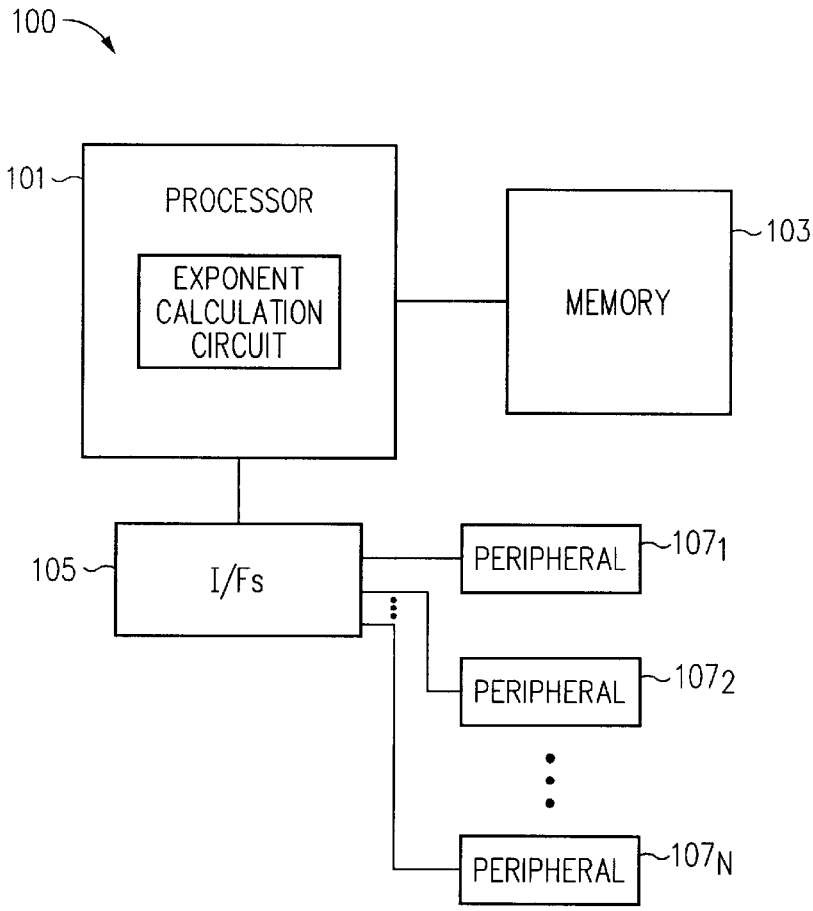
FIG. 1 is a block diagram of a computer system having a floating-point processor with circuitry for calculating resultant exponents according to the present invention.

FIG. 1 is a block diagram of an electronic system 100 having a processor with resultant exponent calculation circuitry in accordance with the present invention. In this embodiment, the processor 101 is a standard 32-bit Sparc®-type processor configured with the present invention, although the present invention may be incorporated into any suitable processor. For example, the present invention may also be incorporated into X86, Alpha®, MIPS®, HP®, Pentium® and PowerPC® processors.

This embodiment of the electronic system 100 is a computer system having a memory 103 and interfaces 105 connected to the processor 1 01. The interfaces 105 are in turned connected to peripherals $\mathbf{107}_1$–$\mathbf{107}_N$, allowing communication between the processor 101 and these peripherals. Each of the peripherals $\mathbf{107}_1$–$\mathbf{107}_N$ can be any suitable type of peripheral, such as a display, a keyboard, a memory device or any other input/output device. Of course, other embodiments of the present invention can be adapted for use in other types of electronic systems, including for example servers, workstations and controllers.

Figure 2:
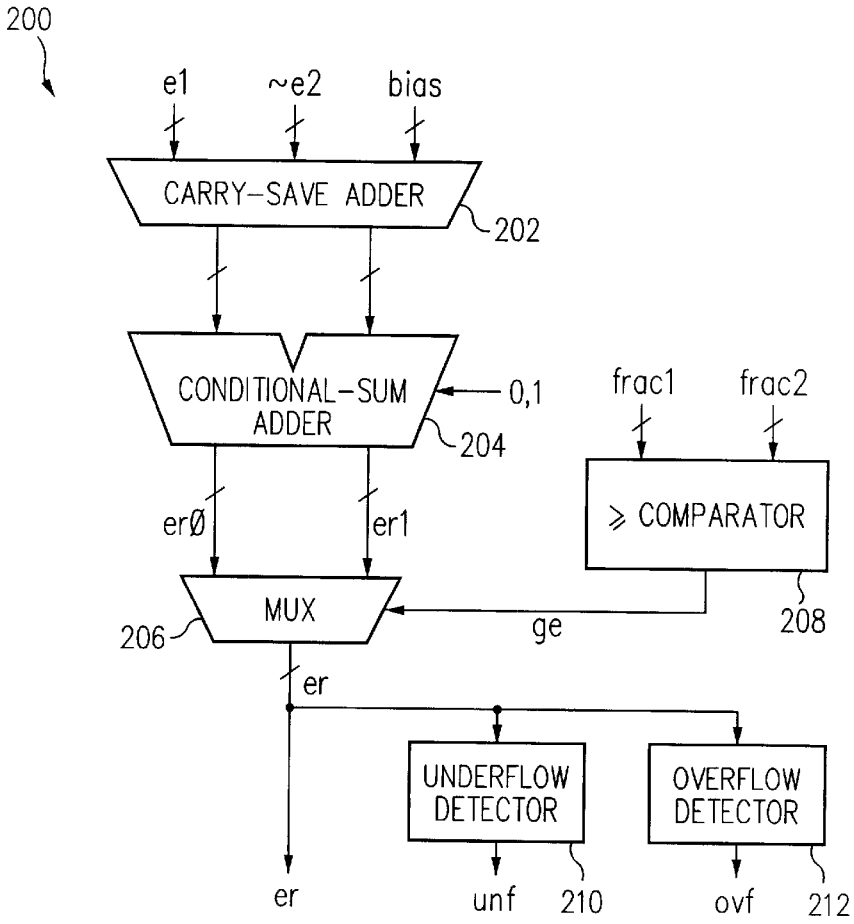
FIG. 2 is a block diagram of a circuit for determining the resultant exponent of floating-point division operations, in accordance with one embodiment of the present invention.

FIG. 2 is a block diagram of a circuit 200 for exactly determining the biased resultant exponent of floating-point division operations before calculation of the resultant mantissa is completed, in accordance with one embodiment of the present invention. As is well known, binary floating-point division is equivalent to division of the operand mantissas and subtraction of the operand exponents. However, because the exponents of the operands are biased, the subtraction of the exponents eliminates the bias, which then must be added in again, as shown below in equation 1:

$$\text{operand1/operand2}=(\text{mantissa1/mantissa2})\cdot 2^{e1-e2+bias} \tag{1}$$

where operand1 is the dividend and mantissa1 and e1 respectively are the mantissa and the biased exponent of the dividend, and where operand2 is the divisor and mantissa2 and e2 respectively are the mantissa and biased exponent of the divisor. The circuit 200 implements in hardware the calculation of the resultant exponent so that the resultant mantissa is in normalized form, as described below.

In this embodiment, the circuit 200 includes a carry-save adder 202, a conditional-sum adder 204, a multiplexer 206 and a comparator 208. The carry-save adder 202 is conventional carry-save adder, which are well known in the art of floating point processors. In floating-point operations compliant with the forementioned ANSI/IEEE Standard 754-1985, each operand of a binary floating-point arithmetic operation can have a normalized mantissa and biased exponent. The standard also specifies the bias for each precision format (e.g., 127 for single precision and 1023 for double precision).

The carry-save adder 202 is coupled to receive the biased exponent e1 of the dividend, the one's complement of the divisor's biased exponent (~e2), and the bias (as defined in the aforementioned the ANSI/IEEE standard for the precision format being used). The carry-save adder 202 generates sum and carry resultants, which are received by the conditional-sum adder 204. The conditional-sum adder 204 is a conventional conditional-sum adder, which are well known in the art of floating-point processors. For example, the conditional-sum adder 204 may be implemented using the conditional-sum adder disclosed in the article "167 MHz Radix-4 Floating Point Multiplier", Proceedings of the $12_{th}$ Symposium on Computer Arithmetic, Jul. 19–21, 1995, by R. Yu and G. Zyner. The conditional-sum adder 204 outputs the sums according to the equations:

$$er0=e1+(\sim e2)+bias \tag{2}$$

$$er1=e1+(\sim e2)+bias+1 \tag{3}$$

where er0 is the biased resultant exponent of the floating-point division operation when the mantissa calculation results in a non-normalized result, and er1 is the biased resultant exponent of the floating-point division operation when the mantissa calculation results in a non-normalized result.

Equations 2 and 3 apply in this embodiment because the mantissas of both the dividend and the divisor are greater than or equal to one and less than two (i.e., in binary form, the mantissa of each operand has an implicit or hidden "1" to the left of the decimal point). Accordingly, the mantissa of the resultant of the division operation must be greater than ½ and less than two. Further, when the fraction (i.e., the portion of the mantissa to the right of the decimal point) of the dividend is less than the fraction of the divisor, the mantissa of the resultant must be greater than ½ and less than one. Therefore, in this case the resultant mantissa is non-normalized (i.e., with a zero to the left of the decimal point) and is right shifted once to be normalized. This right shift of the resultant mantissa requires that the resultant exponent by decreased by one. Further, the biased resultant exponent is the biased exponent of the dividend minus the biased exponent of the divisor. As is well known in binary arithmetic, subtraction of a number is equivalent to the addition of the number's two's complement. However, because the resultant exponent in this case must be decremented by one, the one's complement of the divisor is used. Thus, equation 2 determines the exact biased resultant exponent when the fraction of the dividend is less than the fraction of the divisor.

Conversely, when the fraction of the dividend is greater than or equal to the fraction of the divisor, the mantissa of the resultant must be greater than or equal to one and less than two. Therefore, the resultant mantissa (in binary form) has a "1" to the left of the decimal point as shown in the following equation:

$$1.XXXXXX \ldots X \tag{4}$$

where each "X" represents a either a "1" or a "0" (i.e., a "don't care" bit). Thus, in this case, the resultant mantissa is already normalized. Consequently, because only the one's complement of the divisor was added, the resultant exponent must be incremented by one so that, in effect, the two's complement of the divisor was added. Accordingly, equation 3 determines the exact biased resultant exponent of the floating-point division operation when the mantissa of the dividend is greater than or equal to the mantissa of the divisor.

The comparator 208 is coupled to receive the fractions of the mantissas of the dividend and divisor of the floating-point division operation. The comparator 208 is a conventional comparator that is configured to provide a control signal ge that controls the multiplexer 206 to select er1 or er0 as the exact biased resultant exponent er. The control signal ge causes the multiplexer 206 to output er1 as the biased resultant exponent er when the fraction of the dividend is greater than or equal to the fraction of the divisor. Conversely, when the fraction of the dividend is less than the fraction of the divisor, the comparator 208 causes the multiplexer 206 to select er0 as the biased resultant exponent er. In this embodiment, the operation of the carry-save adder 202, conditional-sum adder 204 and the comparator 208 is relatively fast (e.g., completed in about one processor clock cycle) and is calculated without waiting for the resultant mantissa calculation, thereby taking the biased resultant exponent calculation out of the critical path to increase the performance of the processor.

Further, because the exact biased resultant exponent is available after about one processor clock cycle, a conventional underflow detector 210 and overflow detector 212 can be connected to receive the biased resultant exponent er for underflow and overflow detection well before the next instruction completes (e.g., an instruction typically requires at least four processor clock cycles to complete ). Thus, the need for pessimistic prediction of underflow and overflow is eliminated. Accordingly, no unnecessary underflow and overflow traps are executed, which also increases the performance of the processor.

In a further refinement of this embodiment, the bias received by the carry-save adder 202 may be configurable to provide a bias of 127 for a single precision mode and a bias of 1023 for a double precision mode. These bias values are defined in the aforementioned ANSI/IEEE Standard. In light of this disclosure, those skilled in the art of floating point processors can implement a multiplexer to select between the single precision bias and the double precision bias in accordance with the configured precision format.

Figure 3:
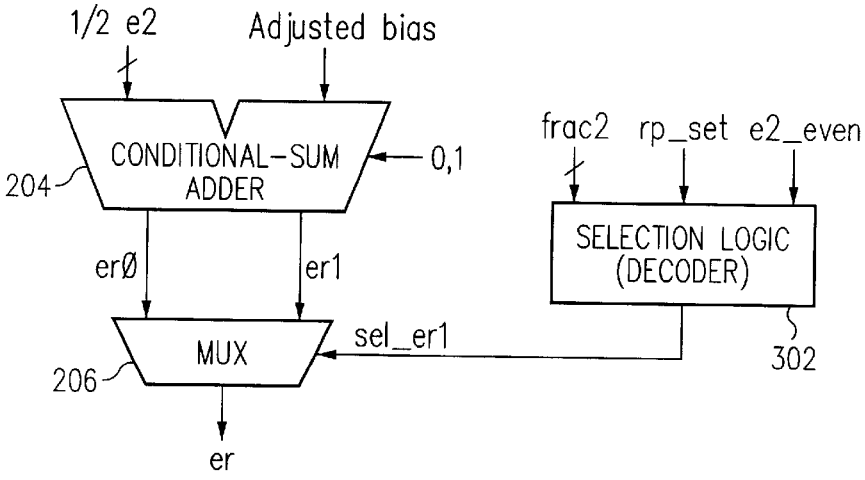
FIG. 3 is a block diagram of a circuit for determining the resultant exponent of floating-point squareroot operations, in accordance with one embodiment of the present invention.

FIG. 3 a block diagram of a circuit 300 for determining the biased resultant exponent of floating-point squareroot operations, in accordance with one embodiment of the present invention. As is well known, finding the resultant squareroot of a normalized floating point operand is equivalent to determining the squareroot of the mantissa of the operand and dividing the operand's exponent by two. However, this operation also reduces the bias by ½; therefore, another ½bias must be added in the exponent calculation so that the resultant exponent is properly biased, as shown in the following equations:

$$\mathrm{SQRT}\{1.XXX \ldots X \cdot 2^{e2}\} \tag{5}$$

$$\mathrm{SQRT}\{1.XXX \ldots X\} \cdot 2^{\frac{1}{2}e2+\frac{1}{2}bias} \tag{6}$$

where SQRT{ } represents the squareroot of the number within the brackets. The circuit 300 implements in hardware the calculation of the biased resultant exponent for the squareroot operation, as described below.

In this embodiment, the circuit 300 includes a conditional-sum adder 204, a multiplexer 206 and a selection logic circuit 302. The conditional-sum adder 204 is coupled to receive the biased exponent e2 of the squareroot operand divided by two (i.e., right-shifted by one bit), and an adjusted bias. Thus, the conditional-sum adder outputs sums in the conventional manner according to the following equations:

$$er0 = \tfrac{1}{2}e2 + \text{adjusted bias} \tag{7}$$

$$er1 = \tfrac{1}{2}e2 + \text{adjusted bias} + 1 \tag{8}$$

where the adjusted bias is ½ of the normal bias (for the precision format being used), which is incremented if e2 is odd. The adjusted bias is added for the following reason. In binary arithmetic, dividing an exponent by two can be easily implemented by shifting the exponent one place to the right of the decimal point and truncating the least significant bit. Thus, when e2 is even, no accuracy is lost in dividing e2 by two and the adjusted bias remains ½ of the bias specified in the ANSI/IEEE Standard for the precision format being used. However, if e2 is odd, the right shift operation loses the least significant bit, resulting in a loss of accuracy in the resultant exponent. Therefore, e2 is reduced by one while increasing the mantissa by a factor of two. Of course, this adjusted operand is equivalent to the original normalized operand. Then, in dividing the exponent by two, the bias is reduced by a further ½, as shown in the following equations:

$$\mathrm{SQRT}\{1X.XXX \ldots X \cdot 2^{e2+bias-1}\} \tag{9}$$

$$\mathrm{SQRT}\{1X.XXX \ldots X\} \cdot 2^{\frac{1}{2}e2+\frac{1}{2}bias-\frac{1}{2})} \tag{10}$$

where SQRT{ } represents the squareroot of the operand within the brackets and e2 is odd. In order to properly bias the resultant exponent, an additional (½bias+½) needs to be added to the exponent so that the resultant exponent is equivalent to (½e2+bias). Thus, when e2 is odd, the adjusted bias is (½bias+½) or ½(bias+1). The adjusted biases for even and odd e2 are summarized below in Table 1.

TABLE 1

| e2 | adjusted bias |
|---|---|
| even | ½ bias |
| odd | ½ (bias + 1) |

It can be shown that the squareroot of a normalized operand (i.e., greater than or equal to one but less than two) is between 1 and the square root of two, inclusive. Thus, the resultant mantissa of the squareroot of a normalized operand mantissa is always normalized. In addition, it can be shown that the squareroot of an operand greater than or equal to two and less than four (i.e., the "even e2" mantissa) is greater than or equal to the square root of two and less than two. Consequently, the resultant mantissa of the squareroot of the adjusted mantissa in the "even e2" case is also always normalized. Because the resultant mantissa is always normalized, there can be no overflow or underflow. Thus, the resultant exponent er will always be equivalent to er0 as provided by the conditional-sum adder 204, except in the rounding case described below.

The ANSI/IEEE Standard includes a rounding mode called round to positive infinity (rp). In this rounding mode, the resultant mantissa calculation may not always result in a normalized number. In particular, the resultant mantissa after the squareroot operation may not be in normalized form under the following conditions: (i) the operand mantissa has no zeros; (ii) e2 is even; and (iii) the rounding mode is rounding to positive infinity (as defined in the aforementioned ANSI/IEEE Standard). As can be shown, when the operand mantissa has no zeros, the squareroot of this mantissa will also have no zeros. As defined in the ANSI/IEEE Standard, in the rp rounding mode, if the resultant mantissa has any "1"s to the right of the least significant bit for the precision format (i.e., bit 52 for double precision and bit 23 for single precision), then a "1" is added to the least significant bit. As a result, the resultant mantissa is rounded to two (i.e., 10.0 . . . 0 in binary representation). Therefore, in order to normalize the resultant mantissa, the mantissa should be right shifted by one place and the resultant exponent incremented.

In the circuit 300, this operation is achieved by selecting the er1 result from the conditional-sum adder 204. More specifically, the multiplexer 206 is connected to receive er0 and er1 from the conditional-sum adder 204 and to receive a select control signal from the selection logic circuit 302. The selection logic circuit 302 monitors the three conditions described above and causes the multiplexer 206 to select er0 as the biased resultant exponent er in all cases except when all three of the above-conditions occur. That is, the selection logic circuit 302 functions as a decoder of the squareroot operand's fraction, biased exponent e2 and the rounding mode. When all three of these conditions occur, the selection logic circuit 302 causes the multiplexer 206 to select er1 as the biased resultant exponent er. In this manner, the circuit 300 determines the exact resultant biased exponent before the mantissa calculation is completed. Consequently, unlike conventional squareroot circuits, the resultant exponent calculation is taken out of the critical path, thereby improving performance.

Figure 4:
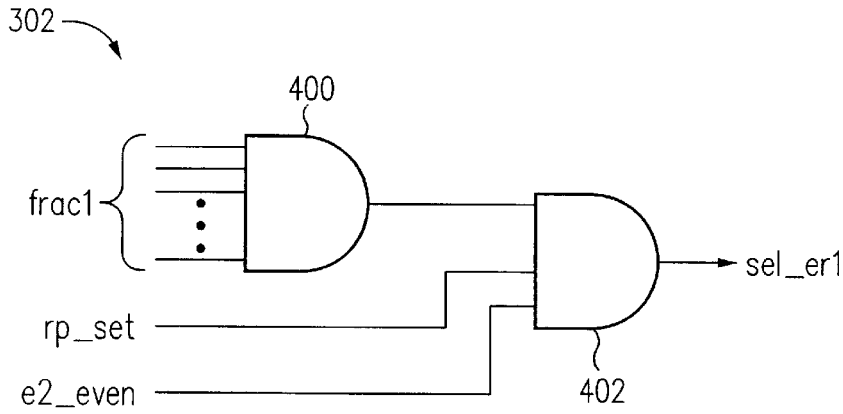
FIG. 4 is a logic diagram of a selection logic circuit, in accordance with one embodiment of the present invention.

FIG. 4 is a logic diagram showing an embodiment of the selection logic circuit 302, according to the present invention. The selection logic circuit 302 is implemented with two AND gates in this embodiment, AND gates 400 and 402. The AND gate 400 is connected to receive each bit of the fraction of the operand. Because in double and single precision the fraction is respectively 52-bits and 23-bits, the AND gate 400 is provided with default "1"s for the input leads not used during single precision operation. Thus, the AND gate 400 outputs a "1" when all of the bits of the fraction are "1". The output lead of the AND gate 400 is connected to an input lead of a three-input AND gate 402. The other two input leads of the AND gate 402 are connected to receive a signal e2_even indicating when at a logic high level that the biased exponent e2 is even, and a signal rp_set indicating when at a logic high level that the rounding mode is rp. Thus, when all of the signals received by the selection logic circuit 302 are "1"s, the AND gate 402 outputs a "1" that causes the multiplexer 206 (FIG. 3) to select er1 from the conditional-sum adder 204. Of course, if any of the received signals are a "0", then the AND gate 402 outputs a "0", which causes the multiplexer 206 to select er0. Of course, those skilled in the art can design other logic circuits or decoders providing equivalent logic functionality without undue experimentation.

Figure 5:
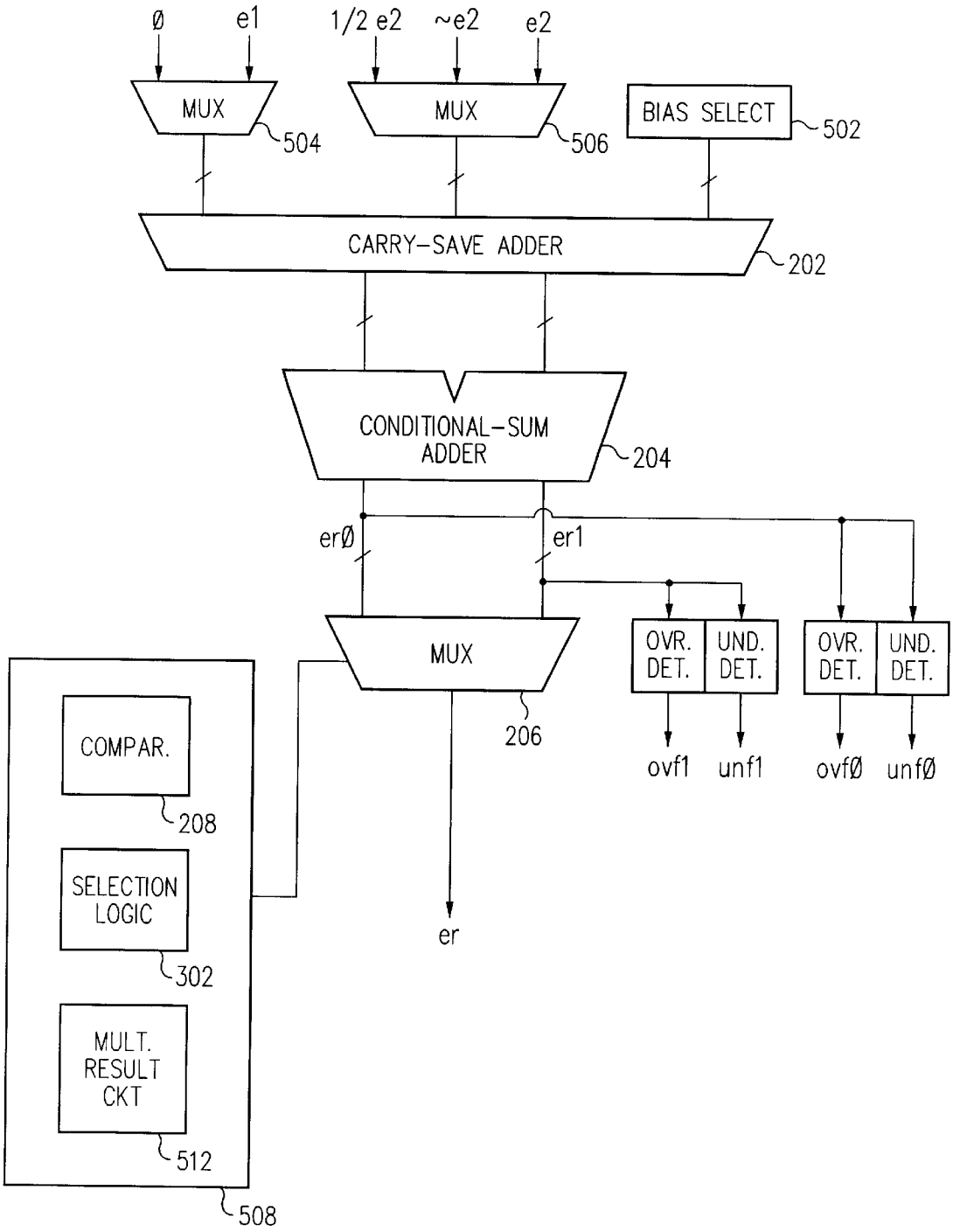
FIG. 5 is a block diagram of a block diagram of a circuit for determining the resultant exponent of floating-point multiplication, division and squareroot operations, in accordance with one embodiment of the present invention.

FIG. 5 is a block diagram of a circuit 500 adapted to calculate the resultant exponent of floating-point division, squareroot and multiplication operations. This embodiment includes a bias selection circuit 502, a first multiplexer 504, a second multiplexer 506, a carry-save adder 202, a conditional-sum adder 204, a selection logic circuit 508 and an output multiplexer 206.

The first multiplexer 504 is connected to receive the biased exponent e1 of the first operand and a hardwired zero. The first multiplexer 504 is controlled to select e1 for multiplication and division operations and to select zero for squareroot operations.

The second multiplexer 506 is connected to receive the biased exponent e2 of the second operand, the one's complement of the biased exponent of the second operand (~e2), and the biased exponent of the second operand divided by two (½e2). The second multiplexer is controlled to select e2 for multiplication operations, (~e2) for division operations or ½e2 for squareroot operations.

The bias selection circuit 502 is connected to receive the true and one's complement of the biases (as defined in the ANSI/IEEE Standard) and adjusted biases (as described above in conjunction for squareroot operations) for single precision and double precision formats. For the precision format being used (i.e., single or double precision), the bias selection circuit 502 is controlled to select the appropriate true bias for division operations, the one's complemented bias (~bias) for multiplication operations, or the adjusted bias for squareroot operations.

The carry-save adder 202 receives the selected output signals of the first and second multiplexers 504 and 506 and the bias selection circuit 502. Thus, for division operations, the carry-save adder 202 receives e1, (~e2) and bias. As a result, the carry-save adder 202 and the conditional-sum adder 204 are equivalent in function to the carry-save adder 202 and the conditional-sum adder 204 in the circuit 200, described previously in conjunction with FIG. 2. Likewise, for squareroot operations, the carry-save adder 202 receives zero, ½e2, and adjusted bias. Because the carry-save adder 202 receives a zero for the first operand, the conditional-sum adder 204 in the circuit 500 is equivalent in function to the conditional-sum adder 204 in the circuit 300, described previously in conjunction with FIG. 3.

However, for multiplication operations, the carry-save adder 202 receives e1, e2,and (~bias)+1. The bias is complemented for multiplication operations because, as is well known in floating-point arithmetic, multiplication is equivalent to multiplication of the operand mantissas and addition of the operand exponents. However, the sum of two biased exponents results in the biasing being doubled. The proper biasing can then be achieved by subtracting the bias from the sum of the exponents. As previously stated, in binary arithmetic, subtraction is equivalent to addition of the two's complement of the number to be subtracted.

The conditional-sum adder 204 receives the carry and sum output signals of the carry-save adder 202 and outputs the sums er0 and er1. For division and squareroot operations, the conditional-sum adder 204 operates as previously described in conjunction with FIGS. 2 and 3, respectively. Similarly, in multiplication operations, the conditional-sum adder 204 outputs er0 and er1, with er0 representing the biased resultant exponent when the resultant mantissa multiplication results in a number in normalized form, and er1 representing the biased resultant exponent when the resultant mantissa multiplication results in a number greater than or equal to two (which requires that the the resultant exponent to be incremented because only the one's complement of the bias was added). The resultant exponents of the multiplication mode are shown in the following equations:

$$er0=e1+e2+(\sim bias)+1 \quad (11)$$

$$er1=e1+e2+(\sim bias)+1+1 \quad (12)$$

where (~bias) is the one's complement of the bias for the precision format (single or double precision) being used.

In this embodiment, in addition to being received by the multiplexer 206, er0 and er1 from the conditional-sum adder 204 are also received by conventional overflow and underflow detectors for division and multiplication operations. Thus, unlike the circuits 200 (FIG. 2) and 300 (FIG. 3) in which selection of er0 and er1 is made before detecting overflow and underflow, in the circuit 500 selection of er0 and er1 is made after the overflow and underflow is detected for both er0 and er1 for both division and multiplication. Then a multiplexer 510 is used to select the set of overflow and underflow detectors proper for the arithmetic operation being performed. The circuit 500 does the overflow and underflow detection before selection because, in this embodiment, the selection process for the floating point multiplication operation is not completed until the end of the mantissa calculation (i.e., the resultant exponent determination is in the critical path). Thus, detecting underflow and overflow before selection slightly increases the performance of the multiplication operation, but at the cost of additional circuitry.

The selection logic circuit 508 includes the comparator 208 (described above in conjunction with FIG. 2) and the selection logic circuit 302 (described above in conjunction with FIG. 3). In addition, the selection logic circuit 508 includes a subcircuit 512 for detecting if the resultant mantissa of the multiplication operation is greater than or equal to two. In one embodiment, the output leads of the comparator 208, selection logic circuit 302 and the subcircuit 512 are received by an OR gate (not shown) to provide the selection control signal for the multiplexer 206. In this embodiment, each of these subelements of the selection logic circuit 508 have a default output signal of "0" when the processor is not performing the arithmetic operation corresponding to the subelement. Thus, the selection logic circuit 508 causes the output multiplexer 206 to select either er0 or er1 as described above for the floating-point division and squareroot embodiments. For floating-point multiplication operations, the subcircuit 512 of the selection logic circuit 508 detects whether the resultant multiplication mantissa is normalized or not normalized. In one embodiment of the subcircuit 512, the subcircuit 512 simply outputs a signal having a logic value equal to the second bit to the left of the decimal point of the resultant mantissa of the multiplication operation to indicate whether the resulting mantissa is in normalized form. If the resultant mantissa is in normalized form, the selection logic circuit 508 causes the output multiplexer 206 to select er0 and, conversely, if the mantissa is not normalized, the selection logic circuit 508 causes the output multiplexer 206 to select er1.

Of course, in other embodiments, the selection control circuit 508 may include different logic circuitry to generate the selection control signal for the output multiplexer 206. For example, a multiplexer (not shown) can be used instead of the OR gate to select the output signal from the comparator 208, selection logic circuit 302 or the subcircuit 512 for division, squareroot or multiplication operations, respectively. In addition, the selected output signal can then be used to select the proper set of overflow and underflow detectors (i.e., the set of detectors receiving er0 or the set receiving er1 ).

In a further refinement of this embodiment, two conventional overflow and two underflow detectors may be coupled to respectively receive the er0 and er1 signals from the conditional-sum adder so that the overflow and underflow of er0 and er1 may be determined concurrently with calculation of the multiplication mantissa resultant. The selection logic circuit is also implemented to select the output signals of the appropriate overflow and underflow detectors. This embodiment allows the use of same resultant exponent circuitry (which takes the resultant exponent calculation out of the critical path) for floating-point multiplication, division and squareroot operations. In addition, for the case of multiplication and division operations, the resultant exponent is calculated significantly faster, thereby eliminating the need for pessimistic prediction of the overflow or underflow of the resultant exponent. The methodology of the embodiments described above is further described in co-pending and co-filed patent application Ser. No. 08/882,250 by the present inventor, which is incorporated herein by reference.

The embodiments of the floating-point division and squareroot circuitry of the present invention described above are illustrative of the principles of this invention and are not intended to limit the invention to the particular embodiments described. For example, while the embodiments described are configured for use in a thirty-two-bit word length system, other embodiments can be adapted by those skilled in the art of floating-point processors for use in systems with different word lengths. In another example, those skilled in the art can combine the division and squareroot circuits without the multiplication circuit. Accordingly, while the preferred embodiment of the invention has been illustrated and described, it will be appreciated that in light of the present disclosure various changes can be made to the described embodiments without departing from the spirit and scope of the invention.

The embodiments of the invention in which an exclusive property or privilege is claimed are defined as follows:

1. A circuit for determining a resultant exponent of a floating-point division operation of a dividend and divisor, the dividend and divisor each having a fraction and a biased exponent, the circuit comprising:

an adder circuit configured to receive the biased dividend exponent (e1), a one's complement of the biased divisor exponent (~e2) and a bias, wherein said adder circuit generates output sums er0 and er1, wherein sum er0 is equal to e1 +(~e2)+bias, and sum er'bis equal to er0+1;

a multiplexer coupled to receive the sums er0 and er1 from said adder circuit; and a selection logic circuit coupled to said multiplexer, and coupled to receive the dividend fraction and the divisor fraction, wherein said selection logic circuit causes said multiplexer to select the sum er0 when the dividend fraction is less than the divisor fraction without waiting for a result of a mantissa computation.

2. The circuit of claim 1 wherein said selection logic causes said multiplexer to select the sum er1 when the dividend fraction is greater than or equal to the divisor fraction.

3. The circuit of claim 2 wherein said selection logic comprises a comparator coupled to receive the divisor fraction and the dividend fraction.

4. The circuit of claim 1 wherein said adder circuit comprises a carry-save adder and a conditional-sum adder.

5. The circuit of claim 4 wherein said carry-save adder is coupled to receive the biased dividend exponent (e1), the one's complement of the biased divisor exponent (~e2) and the bias.

6. The circuit of claim 1 further comprising a underflow detector and an overflow detector, said underflow and overflow detectors coupled to receive the sum selected by said multiplexer.

7. The circuit of claim 1 further comprising a first and second underflow detectors and a first and second overflow detectors, said first underflow and overflow detectors coupled to receive the sum er0 from said adder circuit, and said second underflow and overflow detectors coupled to receive the sum er1 from said adder circuit.

8. A circuit for determining a resultant exponent of a floating-point squareroot operation of an operand having a fraction and a biased exponent (e2), the circuit comprising:

an adder circuit configured to receive e2 and a constant B, wherein said constant B is a bias when e2is even and the bias+1 when e2 is odd wherein said adder is configured output sums er0 and er1, wherein er0 is equal to ½(e2+B), and er1 is equal to er0+1;

a multiplexer coupled to receive the sums er0 and er1 from said adder circuit; and a selection logic circuit coupled to said multiplexer, wherein said selection logic circuit is configured to cause said multiplexer to select the sum er1 when the fraction of the operand has no zeros, e2 is even, and said circuit is configured in a round to positive infinity mode.

9. The circuit of claim 8 wherein said selection logic circuit is further configured to select the sum er1 only when the fraction of the operand has no zeros, e2 is even, and said circuit is configured in a round to positive infinity mode.

10. The circuit of claim 8 wherein said selection logic circuit is further configured to select the sum er0 when any of the following conditions are true: the operand has a zero, e2 is odd, or said circuit is not configured in the round to positive infinity mode.

11. The circuit of claim 8 wherein said adder circuit comprises a conditional-sum adder.

12. A circuit for determining a resultant exponent of a floating-point division operation during a division mode, a floating-point squareroot operation during a squareroot mode and a floating-point multiplication operation during a multiplication mode, each operand of the division, squareroot and multiplication operations having a normalized mantissa and a biased exponent, each mantissa having a fraction, the circuit comprising:

a first multiplexer configured to receive the biased exponent (e1) of the first operand and a zero, wherein said first multiplexer is selectably configured to provide as an output operand at an output port of said first multiplexer either zero during the squareroot mode or e1 during the division and multiplication modes;

a second multiplexer configured to receive the biased exponent (e2) of the second operand, ½e2, and a one's complement of e2 (~e2), wherein said second multiplexer is selectably configured to provide as an output operand at an output port of said second multiplexer either e2 during the multiplication mode, ½e2 during the squareroot mode or ~e2 during the division mode;

a third multiplexer configured to receive constants B1–B4, B1 being equal to a bias, B2 being equal to the ½(bias), B3 being equal to ½(bias+1), and B4 being equal to a one's complement of the bias, wherein said third multiplexer is selectably configured to provide as an output operand at an output port of said third multiplexer either B1 during the division mode, B2 during the squareroot mode when e2 is even, B3 during the squareroot mode when e2 is odd, and B4 during the multiplication mode;

an adder circuit having first, second and third input ports respectively coupled to said output ports of said first, second and third multiplexers, wherein said adder circuit is configured output sums er0 and er1, wherein er0 is equal to a sum of the output operands of said first, second and third multiplexers, and wherein er1 is equal to er0+1;

a fourth multiplexer coupled to receive er0 and er1 from said adder circuit; and a selection logic circuit coupled to said fourth multiplexer, wherein said selection logic circuit is configured to cause said fourth multiplexer to select the sum er1 when:

the first operand's fraction is greater than or equal to the second operand's fraction when said circuit is in the division mode, the second operand's fraction has no zeros, e2 is even, and said circuit is configured in the squareroot mode with a round to positive infinity rounding mode, and a product of the mantissas of the first and second operands is greater than or equal to two when the circuit is in the multiplication mode.

13. The circuit of claim 12 wherein said adder circuit comprises a carry-save adder and a conditional-sum adder.

14. The circuit of claim 12 wherein said selection logic circuit comprises a comparator configured to receive the fractions of the operands during the division mode.

15. The circuit of claim 12 wherein said selection logic circuit further comprises a decoder configured to receive the fraction of the second operand, a first signal, and a second signal, said first signal having a logic one value when the circuit is in the round to positive infinity rounding mode, and said second signal having a logic one value when e2 is even.

16. The circuit of claim 12 further comprising first and second underflow detectors and first and second underflow detectors, said first underflow and overflow detectors coupled to receive er0 from said adder circuit, and said second underflow and overflow detectors coupled to receive er1 from said adder circuit.

17. The circuit of claim 12 wherein the bias is equal to 127 when the circuit is operating in a single precision mode and 1023 when the circuit is operating in a double precision mode.

* * * * *